United States Patent
Ayolasomyajula et al.

(10) Patent No.: US 10,936,324 B2
(45) Date of Patent: Mar. 2, 2021

(54) PROACTIVE HOST DEVICE ACCESS MONITORING AND REPORTING SYSTEM

(71) Applicant: Dell Products L.P., Round Rock, TX (US)

(72) Inventors: Rakesh Kumar Ayolasomyajula, Georgetown, TX (US); Cyril Jose, Austin, TX (US); Choudary Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 16/053,198

(22) Filed: Aug. 2, 2018

(65) Prior Publication Data

US 2020/0042324 A1 Feb. 6, 2020

(51) Int. Cl.
*G06F 9/4401* (2018.01)
*G06F 9/54* (2006.01)
*H04L 29/06* (2006.01)

(52) U.S. Cl.
CPC ............ *G06F 9/4401* (2013.01); *G06F 9/542* (2013.01); *H04L 63/20* (2013.01)

(58) Field of Classification Search
CPC ........ G06F 9/4401; G06F 9/452; G06F 9/542; H04L 63/20
See application file for complete search history.

(56) References Cited

U.S. PATENT DOCUMENTS

| 7,206,833 B1* | 4/2007 | Sarangam | ............... H04L 41/06 709/202 |
| 8,260,893 B1* | 9/2012 | Bandhole | .............. G06F 9/5083 709/221 |
| 2003/0070115 A1* | 4/2003 | Nguyen | .............. G06F 11/0787 714/23 |
| 2008/0155332 A1* | 6/2008 | Landers | ............. G06F 11/1417 714/36 |
| 2009/0006827 A1* | 1/2009 | Rothman | ............ G06F 11/0787 713/1 |

(Continued)

OTHER PUBLICATIONS

"Growth in Security Solutions Shifting From Reactive to Proactive," 2014, 1 page, IDC, https://www.idc.com/infographics/security/IDCSecurityGraphic.pdf.

*Primary Examiner* — Nimesh G Patel
(74) *Attorney, Agent, or Firm* — Haynes and Boone, LLP (57) ABSTRACT

A host device access monitoring and reporting system includes a management system coupled to server devices through a network. Each server device includes a BIOS that generates and transmits pre-boot access event reports for pre-boot access events occurring prior to the completion of a boot process for that server device, and an operating system that generates and transmits post-boot access event reports for post-boot access events occurring subsequent to the completion of the boot process for that server device. A remote access controller in each server device receives pre-boot access event reports from the BIOS in that server device and, in response, publishes pre-boot access event notifications to the management system. The remote access controller in each server device also receives the post-boot access event reports from the operating system in that server device and, in response, publishes post-boot access event notifications to the management system.

20 Claims, 7 Drawing Sheets

(56) References Cited

U.S. PATENT DOCUMENTS

2013/0013905 A1* 1/2013 Held .................... G06F 21/575
                                                                    713/2
2016/0350166 A1* 12/2016 Andrews ............... G06F 11/079

* cited by examiner

PROACTIVE HOST DEVICE ACCESS MONITORING AND REPORTING SYSTEM

BACKGROUND

The present disclosure relates generally to information handling systems, and more particularly to proactively monitoring and reporting information handling system access attempts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handing systems such as, for example, server devices and/or other host devices, are often provided in large datacenters that include many of the host devices connected to a network such as the Internet. In such large datacenters, conventional remote and physical host device access monitoring is limited, and is typically provided by an operating system and requires extensive configuration requirements and dependency-based restrictions. For example, conventional operating system host device access monitoring is enabled via the configuration of the operating system (or installation on the operating system) in each host device that is to be monitored, and provides in-band communication methods that require continued connectivity of the host device being monitored, while providing no ability to monitor attempts to access the host device in real-time, or generate a cumulative audit trail of such access attempts. Furthermore, conventional host device access monitoring provides for limited responses to unauthorized attempts to access the host device, such as locking out the user attempting access for some specific time period after some particular number of attempts.

Accordingly, it would be desirable to provide an improved host device access monitoring and reporting system.

SUMMARY

According to one embodiment, an Information Handling System (IHS) includes a processing system; and a memory system that is coupled to the processing system and that includes instructions that, when executed by the processing system, cause the processing system to provide a remote access controller that is configured to: identify a pre-boot access event report generated by a Basic Input/Output System (BIOS) based on a pre-boot access event that occurred prior to the completion of a boot process for a server device that includes the BIOS and the remote access controller; publish, in response to identifying the pre-boot access event report, a pre-boot access event notification through a network to a management system; identify a post-boot access event report generated by an operating system based on a post-boot access event that occurred subsequent to the completion of the boot process for the server device that provides the operating system and includes the remote access controller; and publish, in response to identifying the post-boot access event report, a post-boot access event notification to the management system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
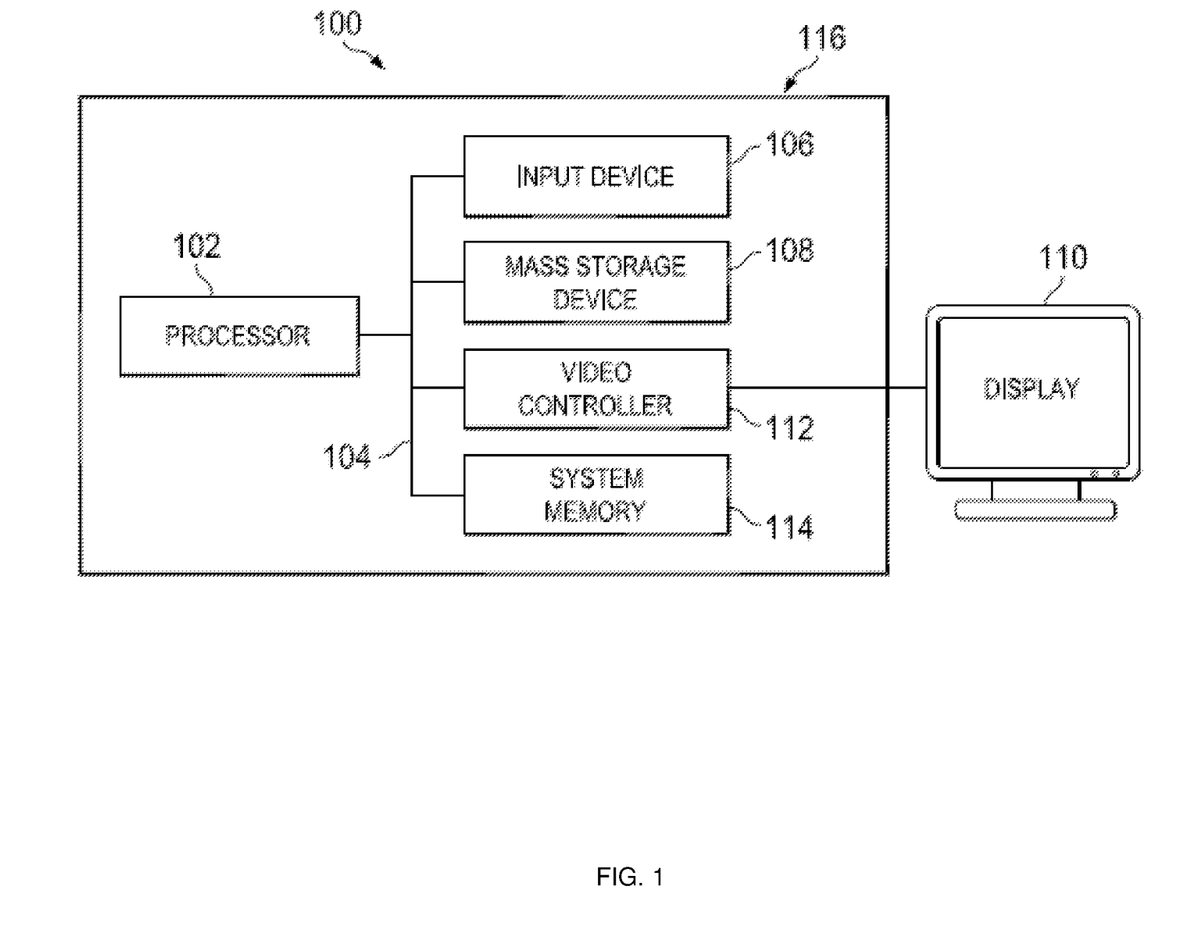
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
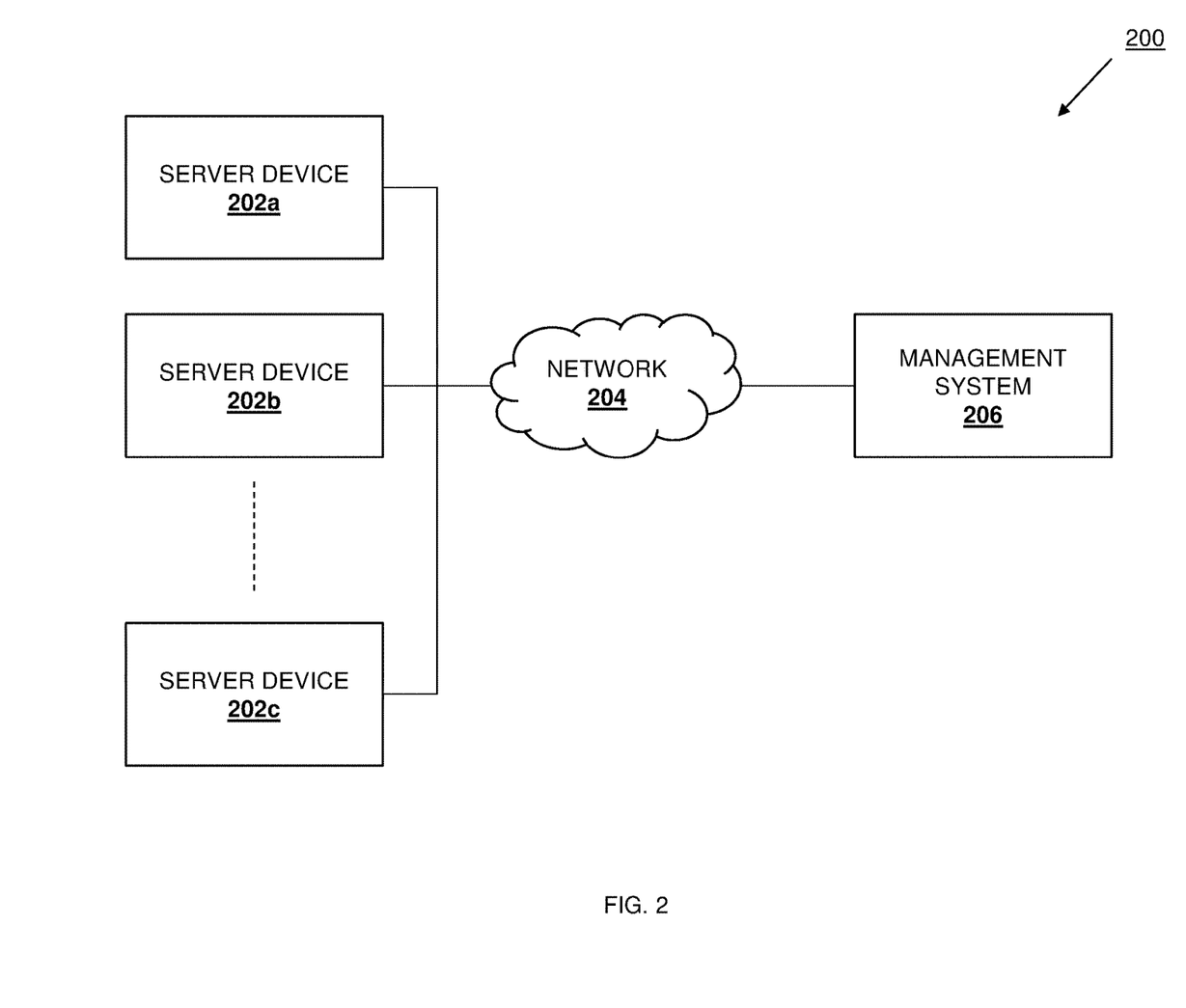
FIG. 2 is a schematic view illustrating an embodiment of a host device access monitoring and reporting system.

Referring now to FIG. 2, an embodiment of a host device access monitoring and reporting system 200 is illustrated. The host device access monitoring and reporting system 200 may include a plurality of host devices that, in the illustrated embodiment, are provided by server devices 202a, 202b, and up to 202c. Any or all of the server devices 202a-c may be provided by the IHS 100 of FIG. 1, and/or may include some or all of the components of the IHS 100. In a specific example, the server devices 202a-c may be provided in a datacenter (e.g., in a server rack, in different server racks, etc.), although other host devices provided in other scenarios may benefit from the teachings of the present disclosure and thus are envisioned as falling within its scope as well. In the illustrated embodiment, the server devices 202a-c are coupled to a network 204 that one of skill in the art in possession of the present disclosure will recognize is described below as a Local Area Network (LAN) (e.g., provided in a datacenter), but may also be provided by other types of network (e.g., the Internet) while remaining within the scope of the present disclosure.

A management system 206 is coupled to the server devices 202a-c through the network 204, and may be provided by the IHS 100 of FIG. 1, and/or may include some or all of the components of the IHS 100. In a specific example, the management device 206 may be provided by a Multi-System Management (MSM) console or integrated DELL® Remote Access Controller (iDRAC) Group Manager console available from DELL® Inc. of Round Rock, Tex., United States, although one of skill in the art in possession of the present disclosure will recognize that other management systems may be provided while remaining within the scope of the present disclosure as well. While a specific host device access monitoring and reporting system 200 is illustrated and described herein, one of skill in the art in possession of the present disclosure will recognize that host device access monitoring and reporting systems may be provided in datacenters and/or other computing device scenarios that include different components and/or component configurations that will remain within the scope of the present disclosure as well.

Figure 3:
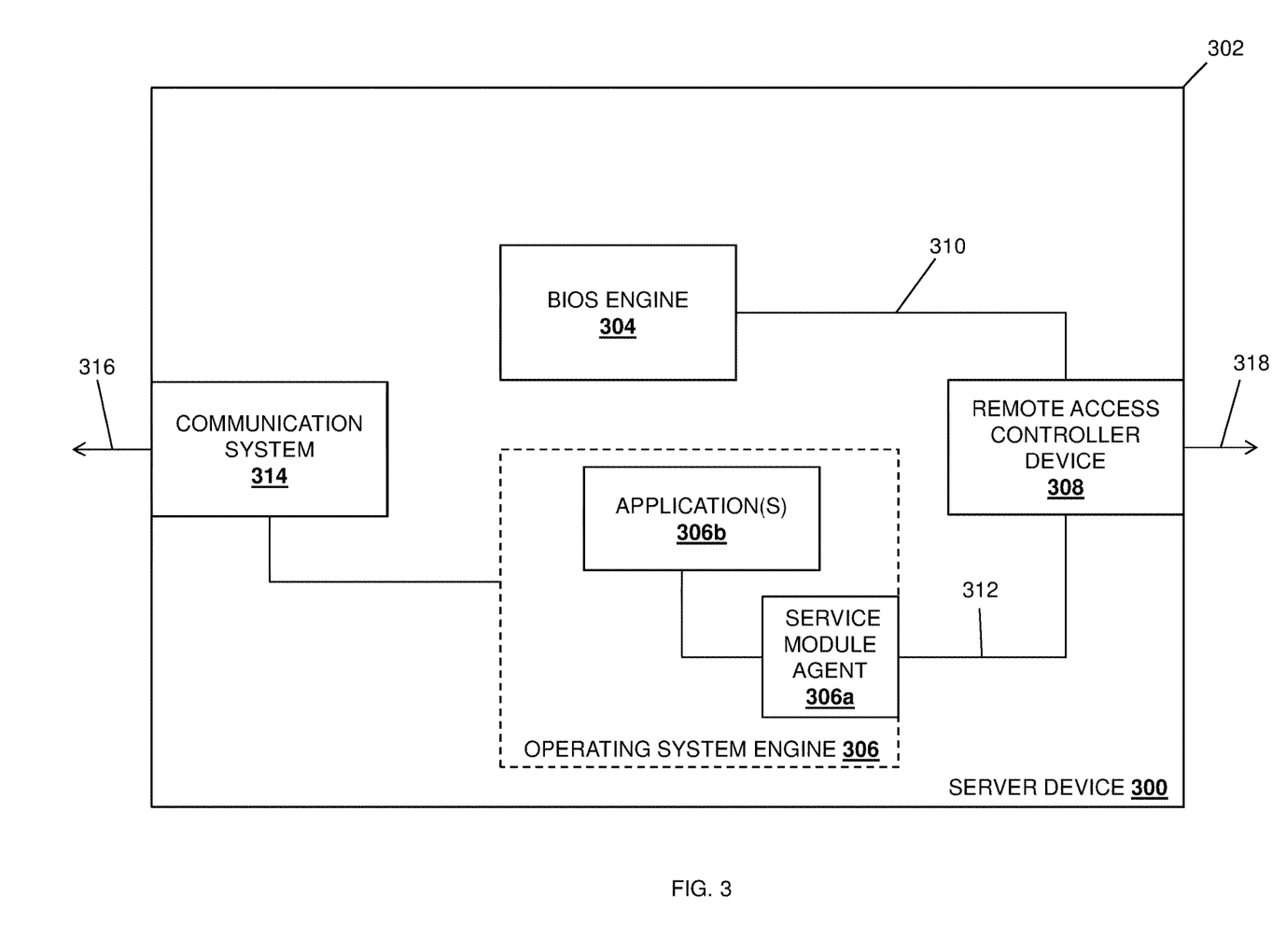
FIG. 3 is a schematic view illustrating an embodiment of a server device in the host device access monitoring and reporting system of FIG. 2.

Referring now to FIG. 3, an embodiment of a server device 300 is illustrated that may be any of the server devices 202a-c discussed above with reference to FIG. 2. As such, the server device 300 may be provided by the IHS 100 and/or may include some or all of the components of the IHS 100. However, the server device 300 and its functionality described below may be provided by other host devices while remaining within the scope of the present disclosure. In the illustrated embodiment, the server device 300 includes a chassis 302 that houses the components of the server device 300, only some of which are illustrated in FIG. 3. For example, the chassis 302 may house a processing system (not illustrated, but which may include the processor 102 discussed above with reference to FIG. 1) that is coupled to a memory system (not illustrated, but which may include the memory 114 discussed above with reference to FIG. 1) that includes instruction that, when executed by the processing system, cause the processing system to provide a Basic Input/Output System (BIOS) BIOS engine 304 that is configured to perform the functions of the BIOS engines and server devices discussed below. As would be understood by one of skill in the art in possession of the present disclosure, the BIOS engine 304 may be provided by non-volatile firmware that is provided in the server device 300 and configured to provide a BIOS that performs hardware initialization during a booting process for the server device 300, as well as runtime services for operating systems and other applications provided on the server device 300. Furthermore, while referred to as a BIOS engine 304 that provides a BIOS, one of skill in the art will recognize that the BIOS engine 304 may be replaced by a Unified Extensible Firmware Interface (UEFI) engine that provides a UEFI that defines a software interface between an operating system (discussed below) and platform firmware (and that may operate to provide legacy support for BIOS services.)

The chassis 302 may also house a processing system (not illustrated, but which may include the processor 102 discussed above with reference to FIG. 1) that is coupled to a memory system (not illustrated, but which may include the memory 114 discussed above with reference to FIG. 1) that includes instruction that, when executed by the processing system, cause the processing system to provide an operating system engine 306 that is configured to perform the functions of the operating system engines and server devices discussed below. For example, the operating system engine 306 may be provided by a Central Processing Unit (CPU) and memory devices in the server device 300, and may be configured to provide an operating system that manages computer hardware and software resources, provides common services for computer programs, and perform a variety of other conventional operating system functions, as well as the novel functionality discussed below, while remaining within the scope of the present disclosure. In the illustrated embodiment, the operating system engine 306 includes a service module agent 306a that may be provided by, for example, an iDRAC Service Module (iSM) available from DELL® Inc. of Round Rock, Tex., United States, and/or other operating system agents that would be apparent to one of skill in the art in possession of the present disclosure. As discussed below, the operating system engine 306 may also include, provide, or otherwise interact with one or more applications 306b that may be coupled to the service module agent 306a. In the examples below, the applications 306b may include critical applications such as business websites, inventory/sales systems, financial systems, hypervisors (e.g., a type 2 hypervisor), and/or other critical applications that would be apparent to one of skill in the art in possession of the present disclosure. However, a variety of other applications may benefit from the teachings of the present disclosure and thus will fall within its scope as well.

In the illustrated embodiment, the chassis 302 also houses a remote access controller device 308. For example, the remote access controller device 308 may be provided by an iDRAC available from DELL® Inc. of Round Rock, Tex., United States. However, in other embodiments, the remote access controller device 308 may be provided by a Baseboard Management Controller (BMC) and/or other management controllers that would be apparent to one of skill in the art in possession of the present disclosure. As illustrated, the remote access controller device 308 may be coupled to the BIOS engine 304 (e.g., via a coupling between the remote access controller device 308 and the processing system that provides the BIOS engine 304.) For example, an Intelligent Platform Management Interface (IPMI) 310, a Shared Memory Architecture (SMA) interface, and/or other BIOS/management controller interfaces and/or communication subsystems that would be apparent to one of skill in the art in possession of the present disclosure may be provided between the remote access controller device 308 and the BIOS engine 304 and/or otherwise provide for the functionality discussed below. Furthermore, the remote access controller device 308 may also be coupled to the operating system engine 306 (e.g., via a coupling between the remote access controller device 308 and the processing system that provides the operating system engine 306.) For example, a Universal Serial Bus (USB) Network Interface Controller (NIC) interface 312 and/or other operating system/management controller interfaces that would be apparent to one of skill in the art in possession of the present disclosure may be provided between the remote access controller device 308 and the operating system engine 306. While not explicitly illustrated, one of skill in the art will recognize that the remote access controller device 308 may include a dedicated power system (i.e., separate from the power system provided for the server device 300), which enables the operation of the remote access controller device 308 even if the server device 300 is without power or otherwise disabled.

In the illustrated embodiment, the chassis 302 also houses a communication system 314 that is coupled to the operating system engine 306 (e.g., via a coupling between the communication system 314 and the processing system that provides the operating system engine 306.) The communication system 314 may include a Network Interface Controller (NIC), a wireless communication system (e.g., a BLUETOOTH® communication system, a Near Field Communication (NFC) system, etc.), and/or other communication components that would be apparent to one of skill in the art in possession of the present disclosure. As illustrated, the server device 300 may be coupled to the network 204 via both the remote access controller device 308 and the communication system 314, with the communication system 314 providing an in-band communication channel 316, and the remote access controller device 308 providing an out-of-band communication channel 318. One of skill in the art in possession of the present disclosure will recognize that the remote access controller may utilize the out-of-band communication channel to communicate information (e.g., through the network 204 to the management system 206) when the BIOS engine 304 and/or the operating system engine 306 are unavailable, when the communication system 314 is unavailable, and even when the server device 300 is unavailable (e.g., via the dedicated power system provided for the remote access controller device 308 as discussed above.) Furthermore, one of skill in the art in possession of the present disclosure will recognize that the out-of-band communication channel 318 may be provided using a variety of methods, including a dedicated network interface that is independent of server host/operating system connectivity status. However, while a specific server device 300 has been illustrated and described, one of skill in the art in possession of the present disclosure will recognize that server devices may include a variety of components and/or component configurations for providing conventional server functionality, as well as the functionality described below, while remaining within the scope of the present disclosure.

Figure 4:
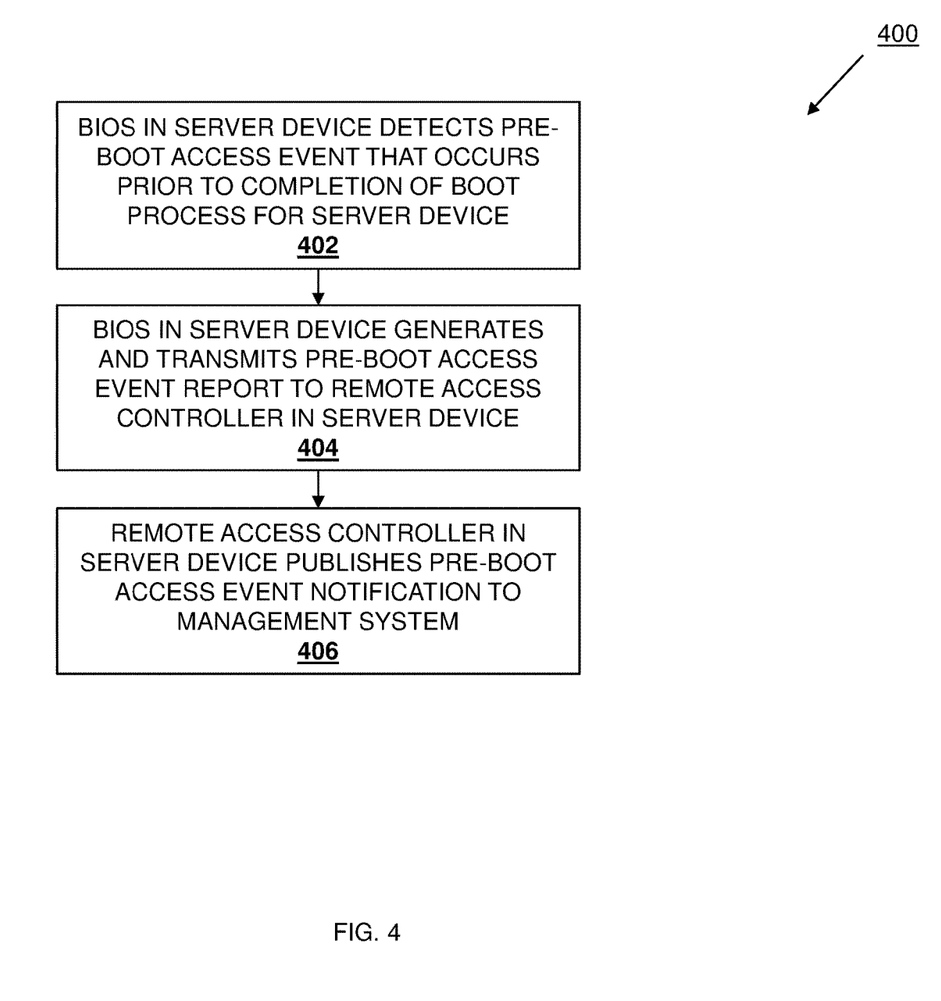
FIG. 4 is a flow chart illustrating an embodiment of a method for host device pre-boot access monitoring and reporting.
Figure 5:
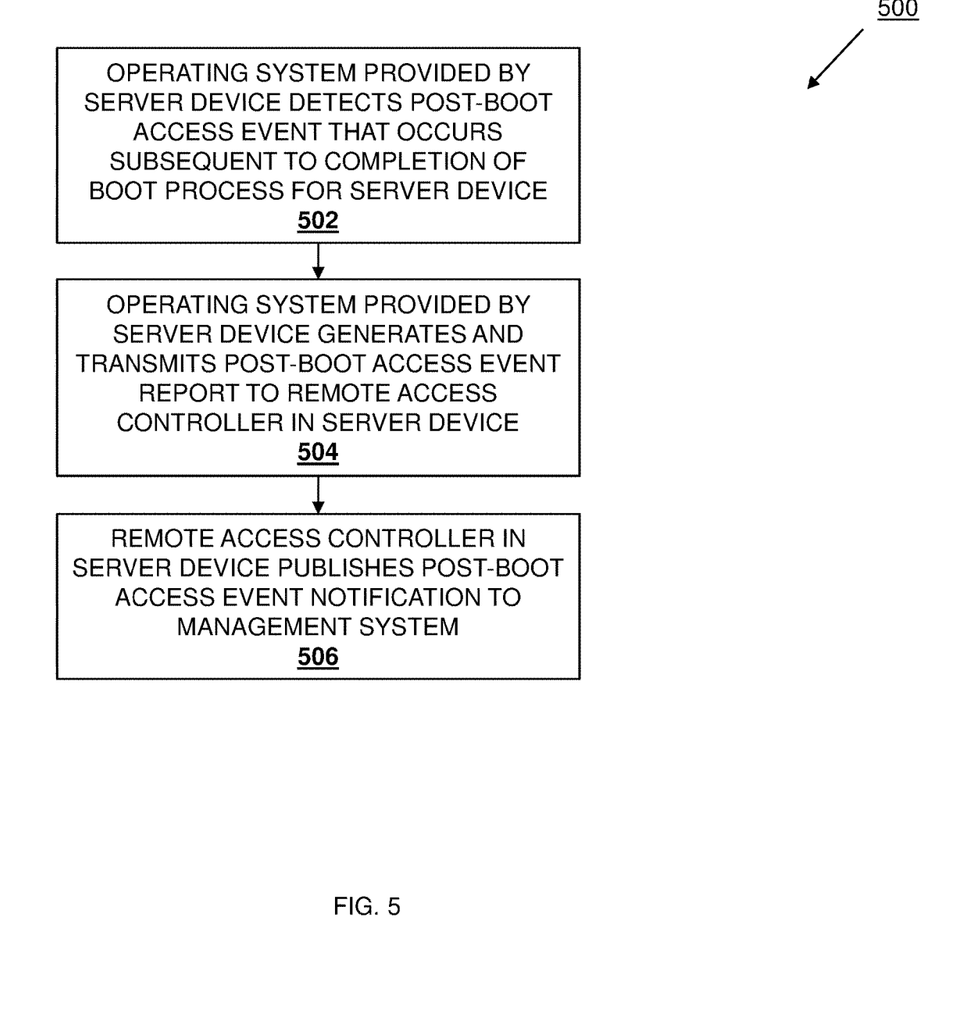
FIG. 5 is a flow chart illustrating an embodiment of a method for host device post-boot access monitoring and reporting.
Figure 6:
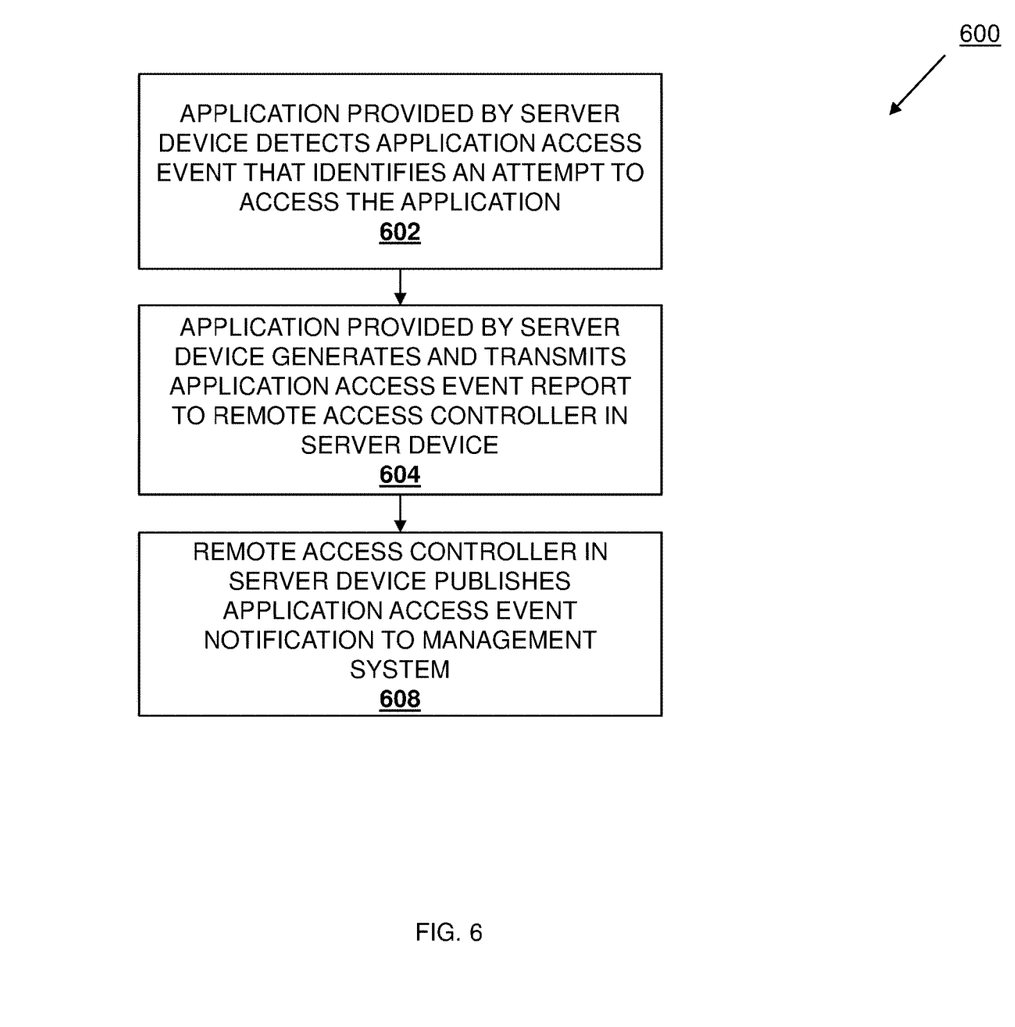
FIG. 6 is a flow chart illustrating an embodiment of a method for host device application access monitoring and reporting.

Referring now to FIGS. 4, 5, and 6, embodiments of methods 400, 500, and 600 for host device access monitoring and reporting are illustrated. As discussed below, the systems and methods of the present disclosure provide for proactive monitoring and reporting of access events associated with host devices, enabling real-time monitoring and reporting of access and availability of host devices and/or their applications, while generating a cumulative audit trail that assists datacenter administrators in managing unauthorized access to the host device, and allows for advanced heuristics to be performed. The systems and methods of the present disclosure may be enabled via a remote access controller, Baseboard Management Controller (BMC), or other management controller that is located in the host device, that is configured with an out-of-band communication channel to a management system, and that may act as an "edge computing device" for server host ecosystem access monitoring that may be assisted by an operating system agent.

As discussed below, the management controller may communicate with a host device BIOS during a host device boot process, or a host device operating system during host device runtime, to receive access event reports for access events that belong to a host device security management event class. In response to such access event reports, the management controller generates access event notifications to the management system via the out-of-band communication channel. As such, the systems and methods of the present disclosure provide an operating-system-independent monitoring/reporting solution that may operates in the absence of a functioning operating system (or host device), and without the need for host device connectivity (e.g., to a datacenter network via its communication system). Furthermore, one of skill in the art in possession of the present disclosure will recognize that the monitoring and reporting for server devices via the systems and methods of the present disclosure enable such management system reporting (e.g., via the remote access controller devices) for server devices with different types of operating systems (e.g., LINUX®, WINDOWS®, etc.) and different hardware configurations.

The method 400 begins at block 402 where a BIOS in a server device detects a pre-boot access event that occurs prior to the completion of a boot process for the server device. Prior to the method 400, pre-boot access event(s) that belong to a server device security management event class may be created, and may be subscribed to by a management system. In some embodiments, the systems and methods of the present disclosure may utilize a novel server device security management event class for "host security/accessibility" that generates a conclusive computing resource access trail for remote login attempts, physical login attempts, north/west configuration changes such as IP loss or DHCP lease changes, etc. For example, the server device security management event class may include attributes such as a host/server device name or other identifier, an access category that identifies a type of access attempt other incident/access violation being reported, an access severity that may quantify a severity of the access attempt, a system health that identifies a health of the host/server device, a remote access controller service tag or other identifier, a server device location of the host/server device, and/or any other attribute that would be apparent to one of skill in the art in possession of the present disclosure.

In some embodiments, users, devices, or applications (e.g., "consuming applications") may listen to, or write triggers on, access events that belong to the server device security management event class. For example, prior to the method 400, the management system 206 may define a pre-boot access event belonging to the server device security management event class, define a pre-boot access event notification for any pre-boot access event belonging to the server device security management event class, subscribe to pre-boot access events and/or pre-boot access event notification, etc. While a few examples of the server device security management event class of the present disclosure have been described, one of skill in the art in possession of the present disclosure will recognize how the pre-boot access events of the server device security management event class, and the pre-boot access event notifications, may be utilized in a variety of manners to provide the functionality discussed below while remaining within the scope of the present disclosure.

In an embodiment, at block 402, the server device 202*a*/300 may perform a boot process in response to, for example, a power-on, reset, and/or other initialization operation that would be apparent to one of skill in the art in possession of the present disclosure. As would be appreciated by one of skill in the art, the boot process may provide a pre-boot environment for the server device 202*a*/300 in which a BIOS provided by the BIOS engine 304 performs a variety of server device control functionality for the server device 202*a*/300, with the boot process being performed subsequent to that initialization of the server device 202*a*/300 and up until the boot process is completed and the server device 202*a*/300 enters a runtime environment in which the operating system performs a variety of server device control functionality for the server device 202*a*/300. At block 402 and during the boot process for the server device 202*a*/300, the BIOS provided by the BIOS engine 304 operates to monitor for pre-boot access events that belong to the server device security management event class and that occur prior to the completion of a boot process for the server device 202*a*/300 by, for example, monitoring for access attempts to the server device 202*a*/300 during the boot process, monitoring for the connection and/or disconnection of devices with the server device 202*a*/300 prior to or during the boot process and/or a variety of other pre-boot access events that would be apparent to one of skill in the art in possession of the present disclosure.

The method 400 then proceeds to block 404 where the BIOS in the server device generates and transmits a pre-boot access event report to the remote access controller in the server device. In an embodiment, at block 404, the BIOS provided by the BIOS engine 304 may detect a pre-boot access event that belongs to the server device security management event class and that occurs prior to the completion of the boot process for the server device 202*a*/300 such as, for example, an access attempt to the server device 202*a*/300 during the boot process, the connection and/or disconnection of a device with the server device 202*a*/300 prior to or during the boot process, and/or a variety of other pre-boot access events that would be apparent to one of skill in the art in possession of the present disclosure. In response to detecting the pre-boot access event, the BIOS provided by the BIOS engine 304 may generate a pre-boot access event report. For example, the pre-boot access event report generated by the BIOS provided by the BIOS engine 304 may include an invalid access category (e.g., invalid user, invalid password, etc.), a device identifier for an affected device, a device health, and/or a variety of other pre-boot access event report information that would be apparent to one of skill in the art in possession of the present disclosure. The BIOS provided by the BIOS engine 304 may then transmit the pre-boot access event report to the remote access controller device 308 via the IPMI 310, SMA interface, and/or other interface/communication subsystem. As such, at block 404, the remote access controller device 308 receives the pre-boot access event report from the BIOS provided by the BIOS engine 304.

The method 400 then proceeds to block 406 where the remote access controller in the server device publishes a pre-boot access event notification to a management system. In an embodiment, at block 406, the remote access controller device 308 publishes a pre-boot access event notification to the management system via the out-of-band communication channel 318. For example, the pre-boot access event notification may include attributes such a name of the server device 202*a*/300 for which the pre-boot access event was detected, an access category that identifies the type of incident or access violation being reported, an access severity that quantifies the severity of the access attempt, information about the health of the server device 202*a*/300, a service tag or other identifier for the remote access controller device 308, a location of the server device 202*a*/300, and/or any other attribute that would be apparent to one of skill in the art in possession of the present disclosure. The remote access controller device 308 may then determine that the management system 206 has subscribed to pre-boot access event notifications for the pre-boot access event that was detected and, in response, publish the pre-boot access event notification such that the management system 206 receives the pre-boot access event notification through the network 204 via the out-of-band communication channel 318. In an embodiment, the management system 206 may store pre-boot access event notifications to generate a pre-boot access event audit trail for the server device 202*a*.

In a specific example of the method 400, the pre-boot access events that belong to the server device security management event class may include a direct (e.g., via a physical connection to the server device 202*a*) or remote (e.g., via a network) "brute force" BIOS access attempt and, at block 402, the BIOS provided by the BIOS engine 304 may monitor for and detect that brute force BIOS access attempt. At block 404, the BIOS provided by the BIOS engine 304 may then generate and transmit a pre-boot access attempt report to the remote access controller device 308 and, in response to receiving the pre-boot access attempt report, the remote access controller device 308 may publish a pre-boot access event notification to the management system 206 that identifies the brute force BIOS access attempt on the server device 202*a*. As such, a system administrator may be proactively alerted to perform a variety of security actions in response to the brute force BIOS access attempt on the server device 202*a*, as opposed to conventional methods that would simply lock the attacker out of the server device 202*a* after some predetermined number of access attempts.

The method 500 begins at block 502 where am operating system provided by the server device detects a post-boot access event that occurs subsequent to the completion of the boot process for the server device. Prior to the method 500, post-boot access event(s) that belong to a server device security management event class may be created, and may be subscribed to by a management system. As discussed above, the systems and methods of the present disclosure may utilize a novel server device security management event class for "host security/accessibility", which may include attributes such as a host/server device name or other identifier, an access category that identifies a type of access attempt other incident/access violation being reported, an access severity that may quantify a severity of the access attempt, a system health that identifies a health of the host/server device, a remote access controller service tag or other identifier, a server device location of the host/server device, and/or any other attribute that would be apparent to one of skill in the art in possession of the present disclosure. Furthermore, users, devices, or applications (e.g., "consuming applications") may listen to, or write triggers on, access events that belong to the server device security management event class. For example, prior to the method 500, the management system 206 may define a post-boot access event belonging to the server device security management event class, define a post-boot access event notification for any post-boot access event belonging to the server device security management event class, subscribe to post-boot access events and/or post-boot access event notification, etc. While a few examples of the server device security management event class of the present disclosure have been described, one of skill in the art in possession of the present disclosure will recognize how the post-boot access events of the server device security management event class, and the post-boot access event notifications, may be utilized in a variety of manners to provide the functionality discussed below while remaining within the scope of the present disclosure.

In an embodiment, at block 502, the server device 202a/300 may complete the boot process discussed above, and enter a runtime environment in which an operating system provided by the operating system engine 306 performs a variety of server device control functionality for the server device 202a/300. At block 502 and subsequent to the completion of the boot process for the server device 202a/300, the operating system provided by the operating system engine 306 operates to monitor for post-boot access events that belong to the server device security management event class and that occur subsequent to the completion of a boot process for the server device 202a/300 by, for example, monitoring for access attempts to the server device 202a/300 while in the runtime environment, monitoring for the connection and/or disconnection of devices with the server device 202a/300 while in the runtime environment, and/or a variety of other post-boot access events that would be apparent to one of skill in the art in possession of the present disclosure. In a specific example, the service module agent 306a may perform the monitoring for the operating system discussed above.

The method 500 then proceeds to block 504 where the operating system provided by the server device generates and transmits a post-boot access event report to the remote access controller in the server device. In an embodiment, at block 504, the operating system provided by the operating system engine 306 may detect a post-boot access event that belongs to the server device security management event class and that occurs subsequent to the completion of the boot process for the server device 202a/300 such as, for example, an access attempt to the server device 202a/300 while in the runtime environment, the connection and/or disconnection of a device with the server device 202a/300 while in the runtime environment, and/or a variety of other post-boot access events that would be apparent to one of skill in the art in possession of the present disclosure. In a specific example, the service module agent 306a provided in the operating system may subscribe to operating system events via the operating system, and operate at block 504 to detect the post-boot access events discussed above.

In response to detecting the post-boot access event, the operating system provided by the operating system engine 306 may generate a post-boot access event report. For example, the post-boot access event report generated by the operating system provided by the operating system engine 306 may include an invalid access category (e.g., invalid user, invalid password, etc.), a device identifier for an affected device, a device health, and/or a variety of other post-boot access event report information that would be apparent to one of skill in the art in possession of the present disclosure. In a specific example, the service module agent 306a may generate the post boot access event report discussed above. The operating system provided by the operating system engine 306 may then transmit the post-boot access event report to the remote access controller device 308 via the USB NIC interface 312 and/or other interface/communication subsystem. In a specific example, the service module agent 306a may transmit the post-boot access event report discussed above. One of skill in the art in possession of the present disclosure will recognize that the use of the service module agent 306a frees the operating system from needing the functionality to detect or provide the information described above to the remote access controller device 308. As such, at block 504, the remote access controller device 308 receives the post-boot access event report from the operating system provided by the operating system engine 306.

The method 500 then proceeds to block 506 where the remote access controller in the server device publishes a post-boot access event notification to the management system. In an embodiment, at block 506, the remote access controller device 308 publishes a post-boot access event notification to the management system via the out-of-band communication channel 318. For example, the post-boot access event notification may include attributes such a name of the server device 202a/300 for which the post-boot access event was detected, an access category that identifies the type of incident or access violation being reported, an access severity that quantifies the severity of the access attempt, information about the health of the server device 202a/300, a service tag or other identifier for the remote access controller device 308, a location of the server device 202a/300, and/or any other attribute that would be apparent to one of skill in the art in possession of the present disclosure. The remote access controller device 308 may then determine that the management system 206 has subscribed to post-boot access event notifications for the post-boot access event that was detected and, in response, publish the post-boot access event notification such that the management system 206 receives the post-boot access event notification through the network 204 via the out-of-band communication channel 318. In an embodiment, the management system 206 may store post-boot access event notifications to generate a post-boot access event audit trail for the server device 202a.

In a specific example of the method 500, the post-boot access events that belong to the server device security management event class may include a direct (e.g., via a physical connection to the server device 202a) or remote (e.g., via a network) "brute force" operating system access attempt and, at block 502, the service module agent 306 that was previously installed with the operating system provided by the operating system engine 306 (and that subscribed to operating system events) may monitor for and detect that brute force operating system access attempt. At block 504, the operating system provided by the operating system engine 306 may then generate and transmit a post-boot access attempt report to the remote access controller device 308 and, in response to receiving the post-boot access attempt report, the remote access controller device 308 may publish a post-boot access event notification to the management system 206 that identifies the brute force operating system access attempt on the server device 202*a*. As such, a system administrator may be proactively alerted to perform a variety of security actions in response to the brute force operating system access attempt on the server device 202*a*, as opposed to conventional methods that would simply lock the attacker out of the server device 202*a* after some predetermined number of access attempts.

In another specific example of the method 500, the post-boot access events that belong to the server device security management event class may include a server device connectivity disruptions and, at block 502, the operating system provided by the operating system engine 306 may monitor for and detect that connectivity disruption (e.g., in response to a Dynamic Host Configuration Protocol (DHCP) change, etc.). At block 504, the operating system provided by the operating system engine 306 may then generate and transmit a post-boot access attempt report to the remote access controller device 308 and, in response to receiving the post-boot access attempt report, the remote access controller device 308 may publish a post-boot access event notification to the management system 206 that identifies the connectivity disruptions for the server device 202*a*. As such, a system administrator may be proactively alerted to perform a variety of security actions in response to the connectivity disruption for the server device 202*a*.

The method 600 begins at block 602 where an application provided by the server device detects an application access event that identifies an attempt to access the application. Prior to the method 600, application access event(s) that belong to a server device security management event class may be created, and may be subscribed to by a management system. As discussed above, the systems and methods of the present disclosure may utilize a novel server device security management event class for "host security/accessibility", which may include attributes such as a host/server device name or other identifier, an access category that identifies a type of access attempt other incident/access violation being reported, an access severity that may quantify a severity of the access attempt, a system health that identifies a health of the host/server device, a remote access controller service tag or other identifier, a server device location of the host/server device, and/or any other attribute that would be apparent to one of skill in the art in possession of the present disclosure. Furthermore, users, devices, or applications (e.g., "consuming applications") may listen to, or write triggers on, access events that belong to the server device security management event class. For example, prior to the method 600, the management system 206 may define an application access event belonging to the server device security management event class, define an application access event notification for any application access event belonging to the server device security management event class, subscribe to application access events and/or application access event notification, etc. While a few examples of the server device security management event class of the present disclosure have been described, one of skill in the art in possession of the present disclosure will recognize how the application access events of the server device security management event class, and the application access event notifications, may be utilized in a variety of manners to provide the functionality discussed below while remaining within the scope of the present disclosure.

Figure 7:
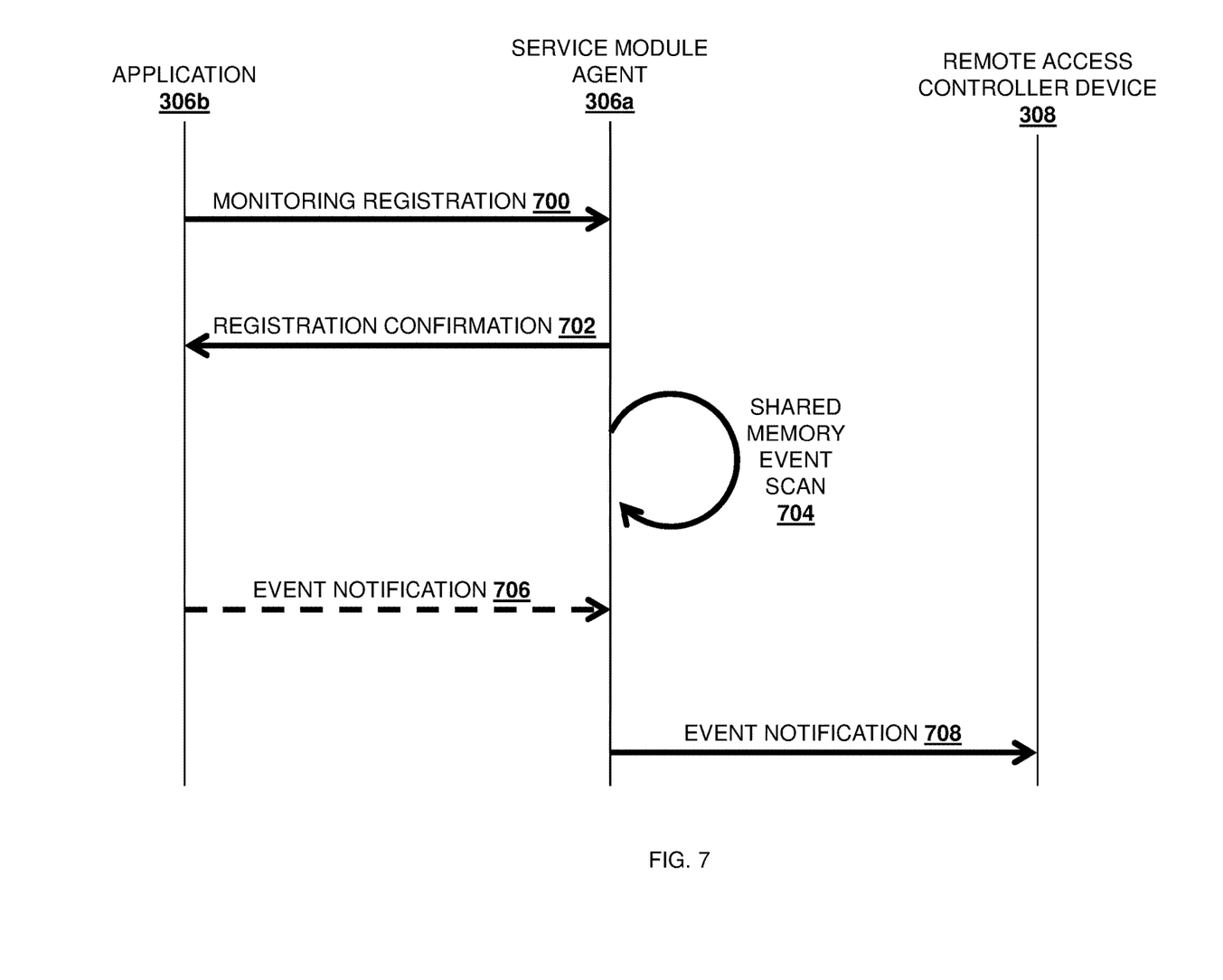
FIG. 7 is a swim-lane diagram illustrating an embodiment of application registration for application access monitoring and reporting.

Furthermore, applications that are to-be monitored according to the method 600 may register for monitoring and reporting prior to the method 600. For example, with reference to FIG. 7, the application 306*a* may provide a monitoring registration communication 700 to the server module agent 306*a*. In response to receiving the monitoring registration communication 700, the service module agent 306*a* may provide a registration confirmation communication 702 back to the application 306*b*. As discussed further below, following the registration confirmation 702, the service module agent 306*a* may operate to periodically perform a shared memory event scan 704 to detect access events identified by the application 306*a* in a memory that is shared with the service module agent 306*a*. In addition, in some embodiments, the application 306*b* may optionally provide an event notification communication 706 to the service module agent 306*a* when an access event occurs. As also discussed further below, when an event is detected via the shared memory event scan 704, or reported by the application 306*a* via event notification communications 706, the service module agent 306*a* provides an event notification communication 708 to the remote access controller 308.

In an embodiment, at block 602, the server device 202*a*/300 may complete the boot process discussed above, and enter a runtime environment in which an operating system provided by the operating system engine 306 performs a variety of server device control functionality for the server device 202*a*/300. At block 602 and subsequent to the completion of the boot process for the server device 202*a*/300, the operating system provided by the operating system engine 306 operates to monitor for application access events that belong to the server device security management event class and that occur subsequent to the completion of a boot process for the server device 202*a*/300 by, for example, monitoring for access attempts to the application 306*b* while in the runtime environment, and/or a variety of other application access events that would be apparent to one of skill in the art in possession of the present disclosure. As discussed above, the service module agent 306*a* may perform the monitoring for the operating system discussed above (e.g., via monitoring of logs or registers utilized by the application 306*b*).

The method 600 then proceeds to block 604 where the application provided by the server device generates and transmits an application access event report to the remote access controller in the server device. In an embodiment, at block 604, the operating system provided by the operating system engine 306 may detect an application access event that belongs to the server device security management event class and that occurs subsequent to the completion of the boot process for the server device 202*a*/300 such as, for example, an access attempt to the application 306*a* while in the runtime environment, and/or a variety of other application access events that would be apparent to one of skill in the art in possession of the present disclosure. In a specific example, the service module agent 306*a* provided in the operating system may subscribe to operating system events via the operating system, and operate at block 604 to detect the application access events discussed above.

In response to detecting the application access event, the operating system provided by the operating system engine 306 may generate an application access event report. For example, the application access event report generated by the operating system provided by the operating system engine 306 may include an invalid access category (e.g., invalid user, invalid password, etc.), an application name, an application health and/or a variety of other application access event report information that would be apparent to one of skill in the art in possession of the present disclosure. In a specific example, the service module agent 306a may generate the application access event report discussed above. The operating system provided by the operating system engine 306 may then transmit the application access event report to the remote access controller device 308 via the USB NIC interface 312 and/or other interface/communication subsystem. As discussed above, the service module agent 306a may transmit the application access event report discussed above. One of skill in the art in possession of the present disclosure will recognize that the use of the service module agent 306a frees the operating system from needing the functionality to detect or provide the information described above to the remote access controller device 308. As such, at block 604, the remote access controller device 308 receives the application access event report from the operating system provided by the operating system engine 306.

The method 600 then proceeds to block 606 where the remote access controller in the server device publishes an application access event notification to the management system. In an embodiment, at block 606, the remote access controller device 308 publishes an application access event notification to the management system via the out-of-band communication channel 318. For example, the application access event notification may include attributes such a name of the server device 202a/300 for which the application access event was detected, an access category that identifies the type of incident or access violation being reported, an access severity that quantifies the severity of the access attempt, information about the health of the server device 202a/300, a service tag or other identifier for the remote access controller device 308, a location of the server device 202a/300, and/or any other attribute that would be apparent to one of skill in the art in possession of the present disclosure. The remote access controller device 308 may then determine that the management system 206 has subscribed to application access event notifications for the application access event that was detected and, in response, publish the application access event notification such that the management system 206 receives the post-boot access event notification through the network 204 via the out-of-band communication channel 318. In an embodiment, the management system 206 may store application access event notifications to generate an application access event audit trail for the application 306a in the server device 202a.

Thus, systems and methods have been described that provide for proactive monitoring and reporting of access events associated with host devices, enabling real-time monitoring and reporting of access and availability of host devices and/or their applications, while generating a cumulative audit trail that assist datacenter administrators in managing unauthorized access to the host device, and allow for advanced heuristics to be performed. The systems and methods of the present disclosure may be enabled via a management controller that is located in the host device, configured with an out-of-band communication channel to a management system, and that communicates with a host device BIOS during a host device boot process, or a host device operating system during host device runtime, to receive access event reports for access events that belong to a host device security management event class. The management controller then generates access event notifications to the management system via the out-of-band communication channel. As such, the systems and methods of the present disclosure provide an operating system independent monitoring/reporting solution that operates even in the absence of a functioning operating system (or host device), and without the need for host device connectivity (e.g., to a datacenter network). While discussed as being used with server devices, one of skill in the art in possession of the present disclosure will recognize that other devices (e.g., a mobile phone) may be provided with a management controller (i.e., similar to the remote access controller device discussed above) to enable the functionality discussed above as well.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A host device access monitoring and reporting system, comprising:
   a management system that is coupled to a network; and
   a plurality of server devices that are coupled to the management system through the network, wherein each of the plurality of server devices includes:
      a respective Basic Input/Output System (BIOS) engine that is configured to generate and transmit a pre-boot access event report for a pre-boot access event that occurs prior to the completion of a boot process for that server device;
      a respective operating system engine that is configured to generate and transmit a post-boot access event report for a post-boot access event that occurs subsequent to the completion of the boot process for that server device; and
      a respective remote access controller device that operates independently from that server device and that is configured to:
         receive the pre-boot access event report from the respective BIOS engine in that server device and, in response, publish a pre-boot access event notification to the management system; and
         receive the post-boot access event report from the respective operating system engine in that server device and, in response, publish a post-boot access event notification to the management system, wherein the publishing the pre-boot access event notification to the management system or the publishing the post-boot access event notification to the management system is performed via an out-of-band communication channel when that server device is unavailable.

2. The system of claim 1, wherein each of the pre-boot access event and the post-boot access event belong to a server device security management event class and are subscribed to by the management system.

3. The system of claim 2, wherein the management system is configured to:
   define, prior to the occurrence of the pre-boot access event, the pre-boot access event notification for the pre-boot access event belonging to the server device security management event class; and define, prior to the occurrence of the post-boot access event, the post-boot access event notification for the post-boot access event belonging to the server device security management event class.

4. The system of claim 1, wherein the respective remote access controller in each of the plurality of server devices is configured to:
publish the post-boot access event notification to the management system via the out-of-band communication channel with the management system.

5. The system of claim 1, wherein the plurality of server devices include a first server device having a first operating system engine that provide a first type of operating system, and a second server device having a second operating system engine that provide a second type of operating system that is different than the first type of operating system.

6. The system of claim 1, wherein each of the plurality of server devices includes:
a respective application engine that is configured to generate and transmit an application access event report for an application access event that identifies an attempt to access an application provided by that application engine, and wherein the respective remote access controller device in that server device is configured to:
receive the application access event report from the respective application engine in that server device and, in response, publish an application access event notification to the management system.

7. An Information Handling System (IHS), comprising:
a processing system; and
a memory system that is coupled to the processing system and that includes instructions that, when executed by the processing system, cause the processing system to provide a remote access controller that operates independently of a server device that includes the remote access controller and that is configured to:
identify a pre-boot access event report generated by a Basic Input/Output System (BIOS) based on a pre-boot access event that occurred prior to the completion of a boot process for the server device that includes the BIOS and the remote access controller;
publish, in response to identifying the pre-boot access event report, a pre-boot access event notification through a network to a management system;
identify a post-boot access event report generated by the operating system based on a post-boot access event that occurred subsequent to the completion of the boot process for the server device that provides the operating system and includes the remote access controller; and
publish, in response to identifying the post-boot access event report, a post-boot access event notification to the management system, wherein the publishing the pre-boot access event notification through the network to the management system or the publishing the post-boot access event notification to the management system is performed via an out-of-band communication channel when the server device is unavailable.

8. The IHS of claim 7, wherein each of the pre-boot access event and the post-boot access event belong to a server device security management event class and are subscribed to by the management system.

9. The IHS of claim 8, wherein the remote access controller that is configured to:

receive, from the management system prior to the occurrence of the pre-boot access event, a definition of the pre-boot access event notification for the pre-boot access event belonging to the server device security management event class; and
receive, from the management system prior to the occurrence of the post-boot access event, a definition of the post-boot access event notification for the post-boot access event belonging to the server device security management event class.

10. The IHS of claim 7, wherein the remote access controller that is configured to:
publish the post-boot access event notification to the management system via the out-of-band communication channel with the management system.

11. The IHS of claim 7, wherein the remote access controller that is configured to:
identify an application access event report generated by an application based on an application access event that identifies an attempt to access the application that is provided by the server device that includes the remote access controller; and
publish, in response to identifying the application access event report, an application access event notification to the management system.

12. The IHS of claim 7, wherein the identifying the pre-boot access event report generated by the BIOS includes receiving the pre-boot access event report via an Intelligent Platform Management Interface (IMPI).

13. The IHS of claim 7, wherein the identifying the post-boot access event report generated by the operating system includes receiving the post-boot event report via a Universal Serial Bus (USB) Network Interface Controller (NIC) interface.

14. A method for host device access monitoring and reporting, comprising:
generating and transmitting, by a Basic Input/Output System (BIOS) in a server device, a pre-boot access event report for a pre-boot access event that occurs prior to the completion of a boot process for the server device;
generating and transmitting, by an operating system provided by the server device, a post-boot access event report for a post-boot access event that occurs subsequent to the completion of the boot process for that server device;
receiving, by a remote access controller in the server device and that operates independently from the server device, the pre-boot access event report from the BIOS in the server device and, in response, publishing a pre-boot access event notification to a management system; and
receiving, by the remote access controller in the server device, the post-boot access event report from the operating system in the server device and, in response, publishing a post-boot access event notification to the management system, wherein the publishing the pre-boot access event notification to the management system or the publishing the post-boot access event notification to the management system is performed via an out-of-band communication channel when the server device is unavailable.

15. The method of claim 14, wherein each of the pre-boot access event and the post-boot access event belong to a server device security management event class and are subscribed to by the management system.

16. The method of claim 15, further comprising:

receiving, by the remote access controller from the management system prior to the occurrence of the pre-boot access event, a definition of the pre-boot access event notification for the pre-boot access event belonging to the server device security management event class; and receiving, by the remote access controller from the management system prior to the occurrence of the post-boot access event, a definition of the post-boot access event notification for the post-boot access event belonging to the server device security management event class.

17. The method of claim 14, further comprising:

publishing, by the remote access controller, the post-boot access event notification to the management system via the out-of-band communication channel with the management system.

18. The method of claim 14, further comprising:

generating and transmitting, by an application provided by the server device, an application access event report for an application access event that identifies an attempt to access the application; and receiving, by the remote access controller in the server device, the application access event report from the application engine in the server device and, in response, publishing an application access event notification to the management system.

19. The method of claim 14, wherein the pre-boot access event report generated by the BIOS is received by the remote access controller via an Intelligent Platform Management Interface (IMPI).

20. The method of claim 14, wherein the post-boot access event report generated by the operating system is received by the remote access controller via a Universal Serial Bus (USB) Network Interface Controller (NIC) interface.

* * * * *